(12) United States Patent
Maiman et al.

(10) Patent No.: US 11,132,592 B1
(45) Date of Patent: Sep. 28, 2021

(54) TRANSACTION CARD INCLUDING REPLACEABLE CHIP INSERT

(71) Applicant: Capital One Services, LLC, McLean, VA (US)

(72) Inventors: Tyler Maiman, Melville, NY (US); Max Miracolo, Brooklyn, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/864,491

(22) Filed: May 1, 2020

(51) Int. Cl.
*G06K 19/07* (2006.01)
*G06K 19/077* (2006.01)

(52) U.S. Cl.
CPC ... *G06K 19/0723* (2013.01); *G06K 19/07773* (2013.01)

(58) Field of Classification Search
CPC ............... G06K 19/0723; G06K 19/07773
USPC .......................................................... 235/492
See application file for complete search history.

(56) References Cited

U.S. PATENT DOCUMENTS

| | | | | |
|---|---|---|---|---|
| 5,818,030 A * | 10/1998 | Reyes | ............ | G06K 19/06196 235/492 |
| 6,554,193 B1 * | 4/2003 | Fehrman | ............ | G06K 19/077 235/487 |
| 6,816,058 B2 * | 11/2004 | McGregor | ............ | H04L 9/0866 340/5.26 |
| 8,446,728 B1 * | 5/2013 | McDonald | ....... | G06K 19/07739 361/737 |
| 10,026,077 B2 * | 7/2018 | Hosny | ............ | G06K 19/0702 |
| 10,817,868 B1 * | 10/2020 | Marsch | ............ | G06Q 20/352 |
| 2004/0211843 A1 * | 10/2004 | Boker | ............ | G06K 19/07733 235/492 |
| 2009/0194597 A1 * | 8/2009 | Hahn | ............ | G06K 19/07745 235/487 |
| 2016/0012465 A1 * | 1/2016 | Sharp | ............ | G06Q 20/384 705/14.17 |
| 2018/0025261 A1 * | 1/2018 | Mosteller | ............ | G06K 19/07769 235/488 |
| 2018/0276647 A1 * | 9/2018 | Geupel | ............ | G06Q 20/40 |
| 2019/0311344 A1 * | 10/2019 | Locke | ............ | G07F 7/0846 |

* cited by examiner

*Primary Examiner* — Allyson N Trail
(74) *Attorney, Agent, or Firm* — Kacvinsky Daisak Bluni PLLC

(57) ABSTRACT

Approaches herein provide a transaction card including an interchangeable ID chip. In some approaches, a transaction card may include a body having a first main side opposite a second main side, a first side opposite a second side, and a first end opposite a second end. The transaction card may further include an insert extending within a cutout section of the body, wherein the cutout section extends towards a center of the body from the first side or the second side, and wherein the insert includes an identification chip.

20 Claims, 4 Drawing Sheets

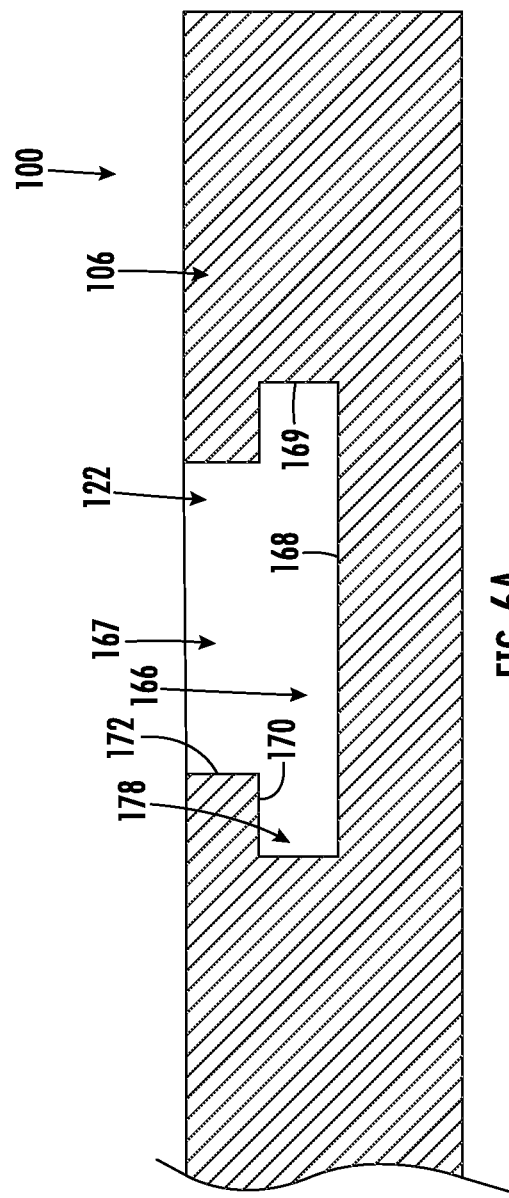
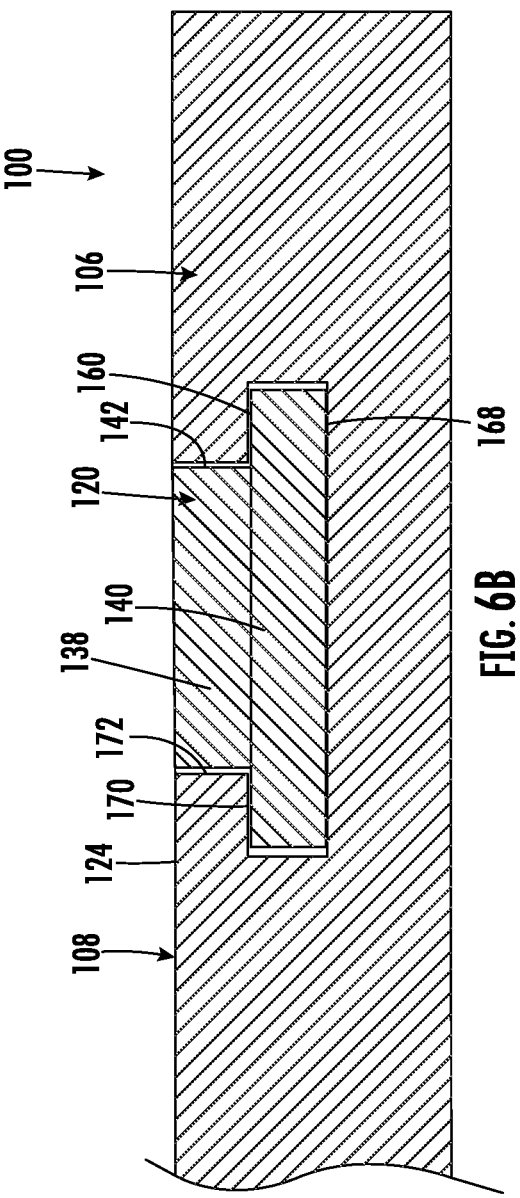
FIG. 6A
FIG. 6B

TRANSACTION CARD INCLUDING REPLACEABLE CHIP INSERT

FIELD

Embodiments of the present disclosure relate to transaction cards and, more particularly, to transaction cards with a replaceable identification chip insert.

BACKGROUND

Transaction cards, such as smart credit/debit cards, access cards, radio frequency identification devices (RFID), etc., have been developed for a wide variety of uses. These transaction cards are typically embedded with an identification (ID) chip. The ID chip may include a microprocessor device and memory containing information associated with an account and/or a user. To avoid the user having to carry around multiple transaction cards, there is a need for a transaction card including an interchangeable ID chip.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In at least one approach according to the disclosure, a transaction card may include a body having a first main side opposite a second main side, a first side opposite a second side, and a first end opposite a second end. The transaction card may further include an insert extending within a cutout section of the body, wherein the cutout section extends towards a center of the body from the first side or the second side, and wherein the insert includes an identification chip.

In at least one embodiment of the present disclosure, a transaction card may include a body having a first main side opposite a second main side, a first side opposite a second side, and a first end opposite a second end. The transaction card may further include a removable insert disposed within a cutout section of the body, wherein the cutout section extends towards a center of the body from the first side or the second side, wherein the removable insert includes an identification chip, and wherein the cutout section extends through the first main side and the second main side.

In at least one embodiment of the present disclosure, a transaction card may include a body having a first main side opposite a second main side, a first side opposite a second side, and a first end opposite a second end. The transaction card may further include an insert extending within a cutout section of the body, wherein the cutout section extends towards a center of the body from the first side or the second side, and wherein the insert includes an identification chip and an antenna.

BRIEF DESCRIPTION OF THE DRAWINGS

The accompanying drawings illustrate example approaches of the disclosure, including the practical application of the principles thereof, as follows:

FIG. 6A is a side cross-sectional view of a cutout section of a body of the transaction card, in accordance with embodiments of the present disclosure; and FIG. 6B is a side cross-sectional view of an insert and a transaction card, taken along cutline A-A in FIG. 1, in accordance with embodiments of the present disclosure.

Figure 1:
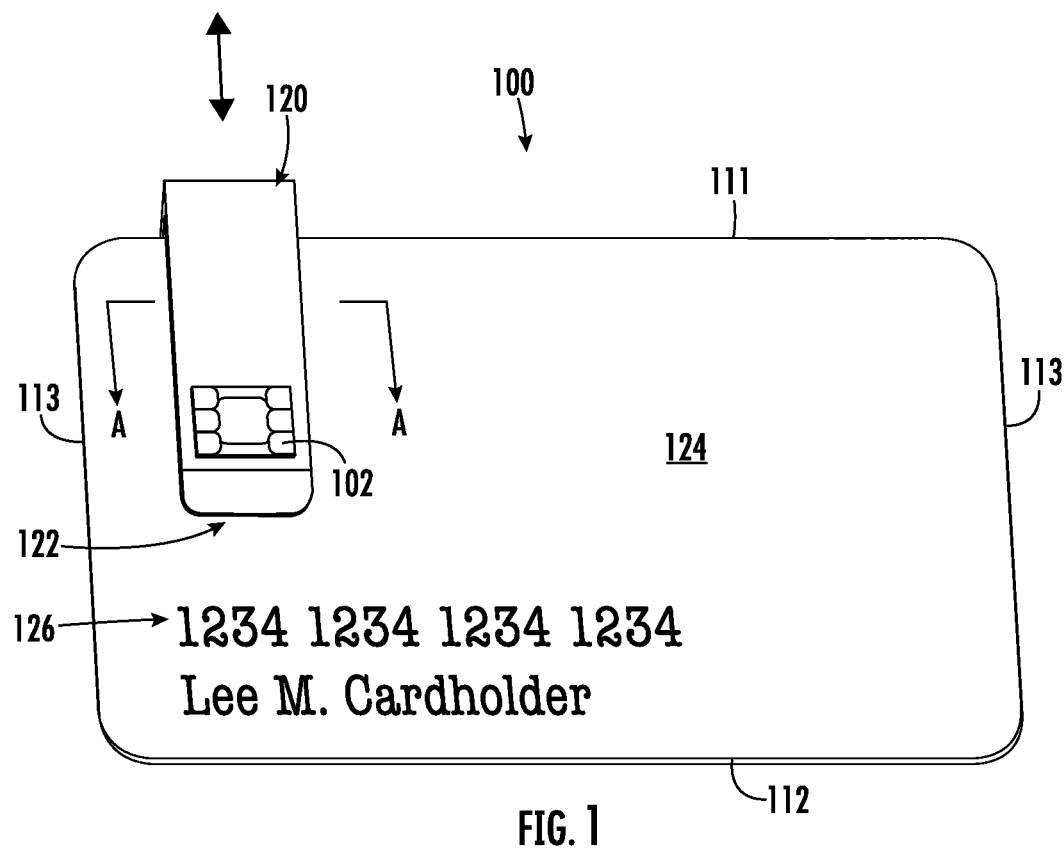
FIG. 1 is a perspective view illustrating a transaction card, in accordance with embodiments of the present disclosure.
Figure 2:
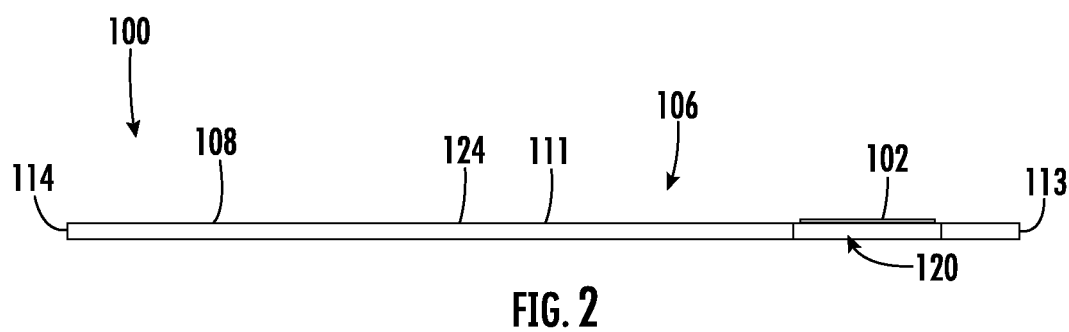
FIG. 2 is a side view of the transaction card of FIG. 1, in accordance with embodiments of the present disclosure.

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, some reference numbers may be omitted in certain drawings.

DETAILED DESCRIPTION

The present embodiments will now be described more fully hereinafter with reference to the accompanying drawings, where some embodiments are shown. The subject matter of the present disclosure may be embodied in many different forms and are not to be construed as limited to the embodiments set forth herein. These embodiments are provided so this disclosure will be thorough and complete, and will fully convey the scope of the subject matter to those skilled in the art. In the drawings, like numbers refer to like elements throughout.

Embodiments herein are directed to transaction cards including an interchangeable identification (ID) chip insert. The interchangeable ID chip insert avoids having to carry multiple cards at once to have access to multiple accounts. Instead, the ID chip insert can be swapped in and out of the card, as desired, similar to a SIM card for a mobile device.

Referring now to FIGS. 1-4, an example transaction card (hereinafter "card") 100 according to embodiments of the disclosure will be described. The card 100 may be a credit or debit card, a RFID passport, or an access card. As will be described in greater detail herein, the card 100 may include multiple layers each having one or more functions. Although non-limiting, the card 100 may be made from polyvinyl chloride (PVC), polyester or polycarbonate. In other embodiments, one or more layers of the card 100 may be made from a metal. Sometimes described herein as contactless due to the method of communication by an identification (ID) chip 102, such as an RFID or Mastercard-Visa (EMV) chip, the card 100 may also provide one or more functions requiring contact. For example, the card 100 may include a magnetic stripe 104 (FIG. 3) and/or a microchip connected to contacts present on an outer layer of the card 100.

As shown, the card 100 may include a body 106 having a first main side 108 and a second main side 110, opposite the first main side 108. Although non-limiting, the first main side 108 may correspond to a front or top side of the card 100, while the second main side 110 may correspond to a back or bottom side of the card 100. The card may further include a first side 111 opposite a second side 112, and a first end 113 opposite a second end 114.

As used herein, the ID chip 102 may be any microprocessor device configured to exchange data electromagnetically, such as a RFID chip. The RFID chip may include a radio frequency inductor, volatile or non-volatile memory storage, a microprocessor, circuitry logic, and/or an antenna 115. In some embodiments, the antenna 115 is a near field communication (NFC) antenna. The antenna 115 may include, for example, a loop antenna, a fractal antenna, and/or the like. While in some embodiments electromagnetic data communications from the RFID chip will take place at radio frequencies, other embodiments may exchange electromagnetic data at different frequencies.

In some embodiments, the ID chip 102 is an EMV chip. An EMV chip card is one example of a dynamic transaction card. A dynamic transaction card may include any type of transaction card that includes a microcontroller-enabled card used in any type of transaction, including, for example, debit cards, credit cards, pre-paid cards, cards used in transportation systems, membership programs, loyalty programs, hotel systems, and the like. A dynamic transaction cards may include enhanced features, including hardware, software, and firmware, beyond the traditional features of a magnetic stripe or EMV card.

An EMV chip may include a number of contacts that may interact with and/or be connected to a terminal configured to read data stored on a processor of an EMV chip. During an EMV transaction, application cryptograms may be used to send and receive data packets between the transaction card 100 and a terminal, such as a merchant terminal. For example, data packets may include user authentication information which an acquisition system and/or issuing financial institution may use to authenticate the transaction card 100 during a transaction. Various cryptographic protocols and/or methods may be used in this data transmission and reception process. Moreover, during a transaction issuing financial institutions and/or acquisition systems may return script commands to the EMV chip via a terminal. These script commands and/or data packets may be transmitted between parties over a network. Script commands may be used, for example, to block transactions, change transaction data stored on the EMV chip (e.g., transaction history, account limits, account balance, and/or the like). Offline data authentication may also take place using, for example public key cryptography to perform payment data authentication. For example, offline data authentication may use Static Data Authentication (SDA), Dynamic Data Authentication (DDA), and/or Combined Data Authentication (CDA).

In some embodiments, the antenna 115 may be accompanied by a secure element (not shown). The secure element (SE) may be a hardware chip specially designed to be tamper proof. In one embodiment, the SE may be used for digitally and physically secure storage of sensitive data, including transaction card data, payment data, health records, car key identifiers, etc. The SE may, for example, store information related to a person, customer, financial institution, or other entity. The SE may store information related to a financial account, such as, for example, transaction card data (e.g., a credit card number, debit account number, or other account identifier, account balance, transaction history, account limits, budget data, recent transactions, and/or the like). The SE may include a computer processor or other computational hardware or software. As one example, the secure element may contain the Visa® and MasterCard® applications for PayWave® and PayPass® transactions. A secure element may take the form of a universal integrated circuit card (UICC) and/or a microSD card. A UICC may identify a user to a wireless operator, store contacts, enable secure connections, and add new applications and services, such as a transaction system.

Although non-limiting, the body 106 may include a potting or filler epoxy around the electrical components to provide strength and/or water resistance. A potting may include a light guide, which may be constructed of optical grade materials such as acrylic, resin, polycarbonate, epoxies, and/or glass. Potting may also include injection molding, such as over molding and/or multi-shot to encapsulate the components of card 100. For example, injection molding may include ABS, thermoplastic elastomers (TPE), thermoplastic vulcanizate (TPV), thermoplastic polyurethane (TPU), PET, polycarbonates (PC), cold lamination of the outer films to the body 106 of the card 100 using thermoactive adhesives, hot lamination of the outer films to the body 106 of the card 100 using thermoactive adhesives, and/or silicone.

As shown, the ID chip 102 may be coupled to or embedded within an insert 120 extending within a cutout section 122 of the body 106. Although not limited to any particular shape, the insert 120 may be a rectangular shaped component slidable within the cutout section 122. In some embodiments, the cutout section 122 is an opening or recessed area extending towards a center of the body 106 from the first side 111 or the second side 112. Providing the insert 120 from the first side 111 or the second side 112 makes it less likely that the insert 120 is unintentionally removed from the body 106, e.g., when the first end 113 of the card 100 is inserted within a point of sale device. In various embodiments, the cutout section 122 may extend partially or entirely through a thickness of the card 100, i.e., between the first main side 108 and the second main side 110.

Although non-limiting, the first main side 108 may include an exterior layer 124 containing identifying indicia 126, such as an account or card number. The card number may be a 16-digit number (e.g., four groups of four digits). In other embodiments, the card number may include a different number of digits. The identifying indicia 126 may be printed over/on the exterior layer 124. However, one skilled in the art will appreciate that the printing of the identifying indicia 126, along with any other indicia, logos, etc., may be applied to any surface or layer of the card 100. Moreover, any suitable printing, scoring, imprinting, marking or like method is within the scope of the present disclosure.

The exterior layer 124 may be a polymer-based material, e.g., a polyester, polyvinylchloride (PVC), polypropylene, polyethylene, acrylic, polycarbonate, and/or like material. Although non-limiting, the exterior layer 124 may be transparent. In other embodiments, the exterior layer 124 may be formed of an acrylic resin (e.g., any of numerous thermoplastic or thermosetting polymers or copolymers of acrylic acid, methacrylic acid, any esters of these acids, or acrylonitrile), ultra violet (UV) curable resin blend including polyester, urethane, diol and carboxyl acrylates with ceramic particles, multifunctional acrylate polymers or any like material. The clear coat resin layer may be applied (or formed) by spraying, screen printing, painting, powder coating or any other like method, and cured (processed) by UV cure, electron beam curing, oven heat, or any radiation curing method or in any other suitable manner. In some embodiments, exterior layer 124 along an exterior surface of the insert 120 is the same or different.

Figure 3:
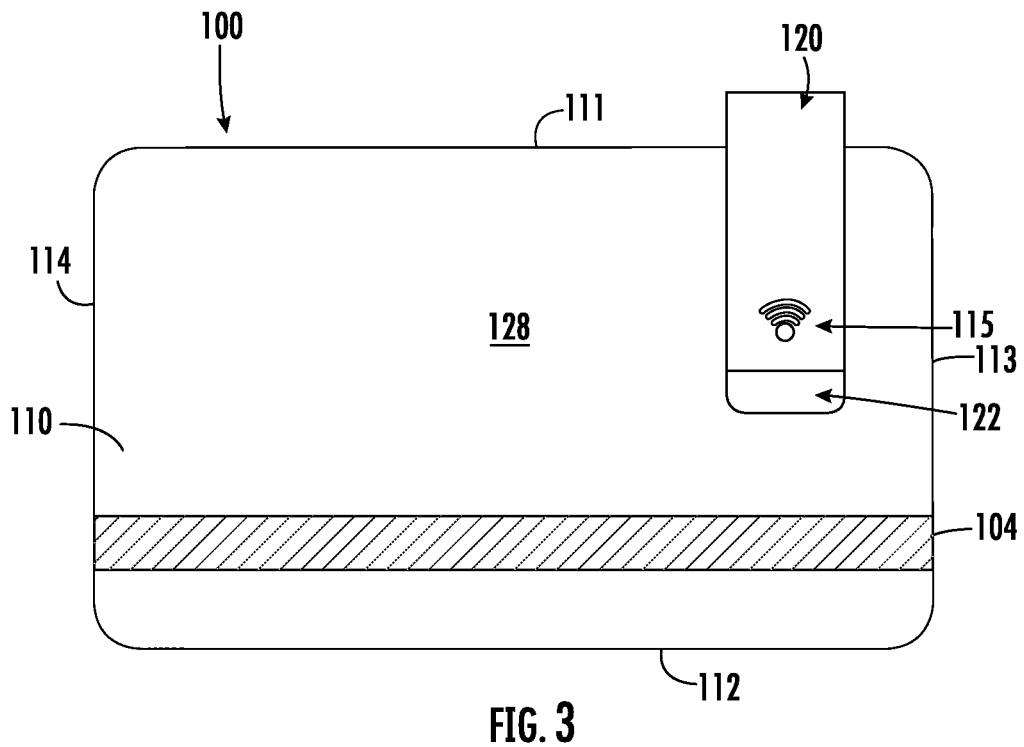
FIG. 3 is bottom view of the transaction card of FIG. 1, in accordance with embodiments of the present disclosure.
Figure 4:
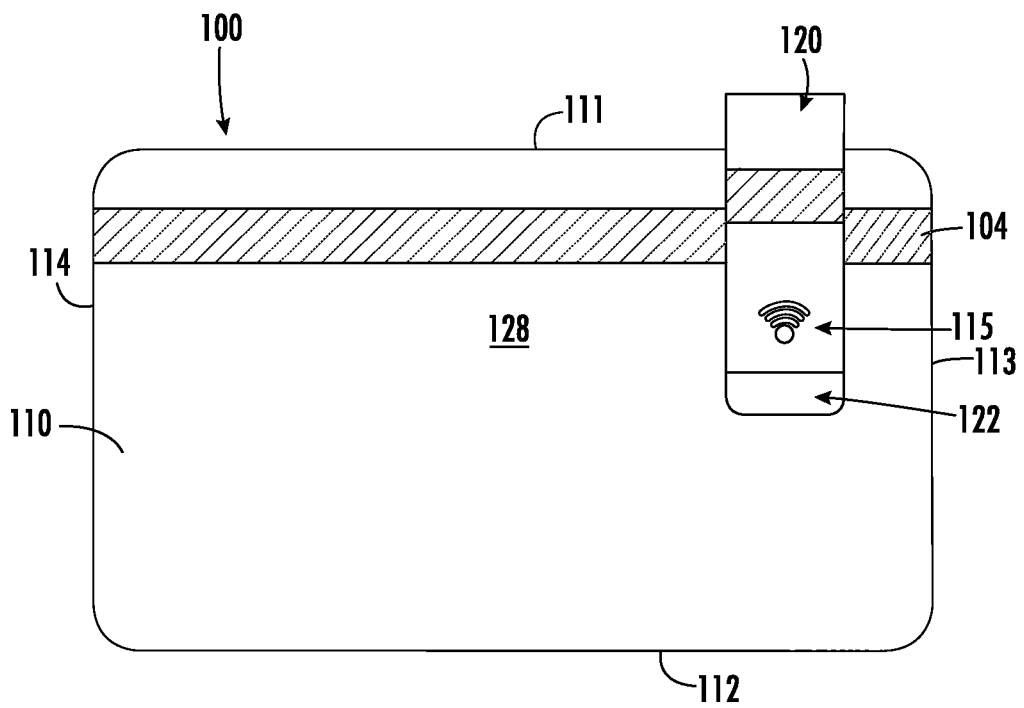
FIG. 4 is bottom view of a transaction card, in accordance with embodiments of the present disclosure.

As further shown in FIG. 3, the card 100 includes the magnetic stripe 104 provided on the second main side 110 of the body 106. In some embodiments, the magnetic stripe is part of a second exterior layer 128. In other embodiments, the magnetic stripe 104 is disposed atop or beneath the second exterior layer 128. The magnetic stripe 104 may contain cardholder data in accordance with standard protocols. For example, in some embodiments, the magnetic stripe 104 includes three tracks, often designated as track 1, track 2, and track 3. Many payment cards, such as credit cards or debit cards, have a magnetic stripe that includes two tracks, such as a magnetic stripe that includes tracks 1 and 2. Other cards have a magnetic stripe that includes three tracks. Many card readers can read a magnetic stripe that includes three tracks, and in cases where the payment card includes a magnetic stripe with only two tracks, the card reader's ability to read a third track is unused. In non-limiting embodiments, when the magnetic stripe 104 is encoded with account data of the card 100 using two tracks, the account data of the card 100 can be encoded in tracks 1 and 2. Track 3 of the magnetic stripe 104 may be unused and devoid of valid data in such a situation.

As further shown in FIG. 3, the magnetic stripe 104 may be positioned along/proximate the second side 112 of the body 106, while the insert 120 may extend from the first side 111. However, in the embodiment of FIG. 4, the magnetic stripe may be positioned along/proximate the first side 111. As a result, a portion 104A of the magnetic stripe 104 may also be provided on the insert 120. This may add an additional security measure, as magnetic stripe 104 cannot be read within the presence of the insert 120.

Although not shown, the card 100 may include second identifying indicia disposed on the second main side 110 thereof. For example, the second identifying indicia may be a card verification value (CVV), such as a 3-digit number. Depending on the type of card, the second identifying indicia may be present on or near a signature strip.

Figure 5:
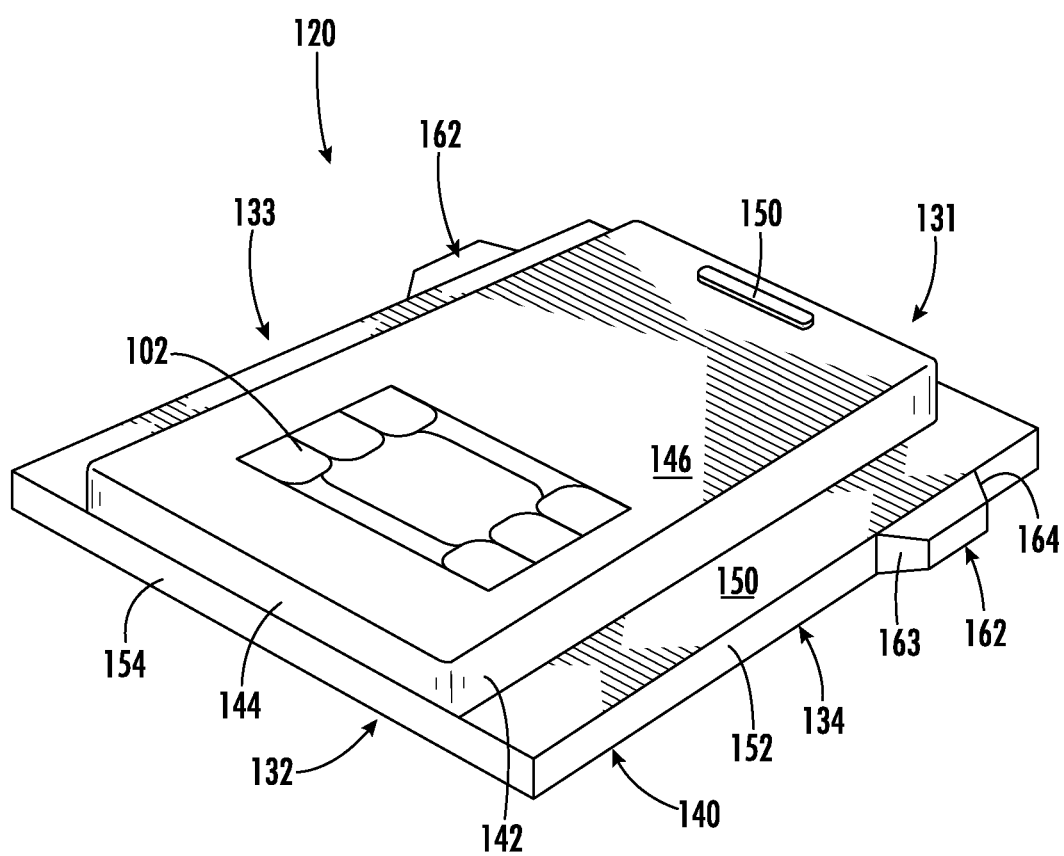
FIG. 5 is a perspective view illustrating an insert including an identification chip, in accordance with embodiments of the present disclosure.

Turning now to FIG. 5, the insert 120 according to embodiments of the present disclosure will be described in greater detail. The insert 120 may include a first end 131 opposite a second end 132, and a first side 133 opposite a second side 134. When the insert 120 is coupled to the body 106 of the card, the second end 132 of the insert may be positioned towards the center of the body 106, while the first end 131 may be positioned along the first side 111 or the second side 112 of the body 106. As shown, the ID chip 102 may be positioned closer to the second end 132 than to the first end 131. Embodiments herein are not limited in this respect, however.

In some embodiments, the insert 120 may include a first section 138 connected to a second section 140. The first and second sections 138, 140 may be separate components or integrally formed. The first section 138 may include a first pair of sidewalls 142 and a first pair of end walls 144. An upper surface 146 of the first section 138 may contain the ID chip 102 and gripping feature 150. The gripping feature 150 may be formed as one or more ridges extending from the upper surface 146 of the first section 138.

As further shown, the second section 140 of the insert 120 may include a second pair of sidewalls 152 and a second pair of end walls 154. An upper surface 160 of the second section 140 may extend between the second pair of sidewalls 152 and the first pair of sidewalls 142. Although non-limiting, a plane defined by the upper surface 160 of the second section may generally be perpendicular to a plane defined by the second pair of sidewalls 152. The second pair of sidewalls 152 may include one or more tabs or locking elements 162 extending outwardly for engagement with corresponding indentations of the cutout section 122 of the card 100. In some embodiments, each locking element 162 may include first and second sloped sidewalls 163, 164 which resist movement of the insert 120 relative to the card 100. It will be appreciated that any number and/or configuration of locking elements 162 may be employed in other embodiments. For example, the second pair of sidewalls 152 may include an indentation while the inner walls defining the cutout section 122 may include a male locking feature.

Turning to FIG. 6A, a side cross-sectional view of the cutout section 122 according to embodiments of the present disclosure will be described in greater detail. As shown, the cutout section 122 may be a cavity or recess within the body 106 of the card 100. In some embodiments, the cutout section 122 may include a first section 166 and a second section 167, the first section 166 including a pair of slots 178 extending laterally. Each of the pair of slots 178 is operable to receive a corresponding locking element 162 of the insert 120. The first section 166 may include a bottom surface 168 extending between a first pair of sidewalls 169. In some embodiments, the first pair of sidewalls 169 may include one or more indentations (not shown) to receive the locking elements 162 of the insert. The slot(s) 178 of the first section 166 may be further defined by an upper wall 170. The second section 167 may be defined by a second pair of sidewalls 172.

When the insert 120 is coupled within the cutout section 122, as demonstrated in FIG. 6B, a bottom surface of the insert 120 may abut or rest atop the bottom surface 168. The upper surface 160 of the second section 140 of the insert 120 is generally constrained by the upper wall 170 of the first section 166. The first pair of sidewalls 142 of the first section 138 of the insert 120 is generally constrained by the second pair of sidewalls 172 of the second section 167 of the cutout section 122. Once coupled together, the upper surface 146 of the first section 138 of the cutout section 122 is generally co-planar with the exterior layer 124 of the first main side 108 of the body 106.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

Although non-limiting, the cards described herein may have standardized dimensions. For example, ISO/IEC 7816 is an international standard related to electronic identification cards with contacts, especially smart cards, managed jointly by the International Organization for Standardization (ISO) and the International Electrotechnical Commission (IEC). There are other standards, however, such as ISO/IEC 14443 for contactless cards (PayPass, PayWave, ExpressPay). A further standard ISO/IEC 7810 ID-1, with which most credit cards are compliant, defines dimensions as 85.60×53.98 mm (3.370×2.125 in) and a thickness of 0.76 mm (0.030 in).

Furthermore, it will be appreciated that the card 100 shown and described herein may include include a variety of additional hardware and software components to provide contactless payments and/or communications. For example, the card 100 may include an output layer, potting, application (e.g., a Java Applet), application integration (e.g., Java Applet integration), one or more sensors, a display, a display driver, firmware, a bootloader, a microcontroller, one or more antenna, an energy storage component, power management, a flexible PCB, a chassis, and/or card backing.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A transaction card, comprising:
    a body having a first main side opposite a second main side, a first side opposite a second side, and a first end opposite a second end, wherein a first dimension of the body extending between the first and second ends along a first axis is greater than a second dimension of the body extending between the first and second sides along a second axis;
    an insert extending within a cutout section of the body, wherein the cutout section extends towards a center of the body from the first side or the second side, and wherein the insert includes an identification chip; and
    a magnetic stripe, wherein a first portion of the magnetic stripe is located on the insert and a second portion of the magnetic stripe extends along the second main side of the body, from a first edge and a second edge defining the cutout section of the body.

2. The transaction card of claim 1, wherein the identification chip is disposed along the first main side.

3. The transaction card of claim 2, wherein the magnetic stripe is positioned proximate the second side of the body, and wherein the insert extends towards the center of the body from the first side.

4. The transaction card of claim 1, wherein the cutout section extends through the first main side and the second main side.

5. The transaction card of claim 1, wherein the cutout section extends only through the first main side.

6. The transaction card of claim 1, the cutout section further comprising a slot engaged with a tab of the insert.

7. The transaction card of claim 1, wherein the insert and the cutout section are located between the center of the body and the first end of the body.

8. The transaction card of claim 1, a locking element securing the insert within the cutout section.

9. The transaction card of claim 1, the insert further comprising an antenna.

10. A transaction card, comprising:
    a body having a first main side opposite a second main side, a first side opposite a second side, and a first end opposite a second end, wherein a first dimension of the body extending between the first and second ends along a first axis is greater than a second dimension of the body extending between the first and second sides along a second axis;
    a removable insert disposed within a cutout section of the body, wherein the cutout section extends towards a center of the body from the first side or the second side, wherein the removable insert includes an identification chip, and wherein the cutout section extends through the first main side and the second main side; and
    a magnetic stripe, wherein a first portion of the magnetic stripe is located on the removable insert and a second portion of the magnetic stripe extends along the second main side of the body, from a first edge and a second edge defining the cutout section of the body.

11. The transaction card of claim 10, wherein the identification chip is disposed along the first main side.

12. The transaction card of claim 11, wherein the magnetic stripe is positioned proximate the second side of the body, and wherein the removable insert extends towards the center of the body from the first side.

13. The transaction card of claim 10, the cutout section further comprising a slot operable to receive a tab of the removable insert.

14. The transaction card of claim 10, wherein the removable insert and the cutout section are located between the center of the body and the first end of the body.

15. The transaction card of claim 10, a locking element securing the removable insert within the cutout section.

16. The transaction card of claim 10, further comprising a near field communication (NFC) antenna embedded within the removable insert.

17. A transaction card, comprising:
- a body having a first main side opposite a second main side, a first side opposite a second side, and a first end opposite a second end, wherein a first dimension of the body extending between the first and second ends along a first axis is greater than a second dimension of the body extending between the first and second sides along a second axis;
- an insert extending within a cutout section of the body, wherein the cutout section extends towards a center of the body from the first side or the second side, and wherein the insert includes an identification chip and an antenna; and
- a magnetic stripe, wherein a first portion of the magnetic stripe is located on the insert and a second portion of the magnetic stripe extends along the second main side of the body, from a first edge and a second edge defining the cutout section of the body.

18. The transaction card of claim 17, further comprising a magnetic stripe along the second main side, wherein the identification chip is disposed along the first main side.

19. The transaction card of claim 18, wherein the magnetic stripe is positioned proximate the second side of the body, and wherein the insert extends towards the center of the body from the first side.

20. The transaction card of claim 17, wherein the antenna is a near field communication (NFC) antenna and the identification chip is an EMV chip.

* * * * *